(12) United States Patent
Kolar et al.

(10) Patent No.: US 12,143,289 B2
(45) Date of Patent: Nov. 12, 2024

(54) SASE POP SELECTION BASED ON CLIENT FEATURES

(71) Applicant: Cisco Technology, Inc., San Jose, CA (US)

(72) Inventors: Vinay Kumar Kolar, San Jose, CA (US); Jean-Philippe Vasseur, Saint Martin d'Uriage (FR); Michal Wladyslaw Garcarz, Cracow (PL)

(73) Assignee: Cisco Technology, Inc., San Jose, CA (US)

( * ) Notice: Subject to any disclaimer, the term of this patent is extended or adjusted under 35 U.S.C. 154(b) by 74 days.

(21) Appl. No.: 17/712,423

(22) Filed: Apr. 4, 2022

(65) Prior Publication Data
US 2023/0318964 A1 Oct. 5, 2023

(51) Int. Cl.
*H04L 45/12* (2022.01)
*H04L 45/00* (2022.01)
*H04L 45/42* (2022.01)

(52) U.S. Cl.
CPC .......... *H04L 45/123* (2013.01); *H04L 45/126* (2013.01); *H04L 45/14* (2013.01); *H04L 45/42* (2013.01)

(58) Field of Classification Search
CPC ..... H04L 45/123; H04L 45/126; H04L 45/14; H04L 45/42
USPC .................................. 709/223–225, 238–243
See application file for complete search history.

(56) References Cited

U.S. PATENT DOCUMENTS

| | | | |
|---|---|---|---|
| 11,025,747 B1 * | 6/2021 | Keogh | ................ H04L 61/4511 |
| 11,159,447 B2 | 10/2021 | Vasseur et al. | |
| 11,159,576 B1 | 10/2021 | Ly et al. | |
| 2011/0243553 A1 * | 10/2011 | Russell | ............... H04L 67/1068 |
| | | | 398/115 |
| 2018/0270121 A1 * | 9/2018 | Stringfellow | ........ G06Q 10/047 |
| 2020/0084152 A1 | 3/2020 | Zhang et al. | |
| 2020/0296136 A1 | 9/2020 | Liu et al. | |
| 2021/0044623 A1 | 2/2021 | Bosch et al. | |
| 2021/0336934 A1 * | 10/2021 | Deshmukh | ............ H04L 63/105 |
| 2022/0006726 A1 * | 1/2022 | Michael | ............. H04L 43/0876 |

OTHER PUBLICATIONS

Da Costa et al., "Cloud Services Evaluation through QoE: A Methodological Approach", Oct. 1, 2015, IEEE, 2015 27th International Symposium on Computer Architecture and High Performance Computing (SBAC-PAD) (2015, pp. 122-129) (Year: 2015).*

* cited by examiner

*Primary Examiner* — Davoud A Zand
(74) *Attorney, Agent, or Firm* — BEHMKE INNOVATION GROUP LLC; James M. Behmke; James J. Wong

(57) ABSTRACT

In one embodiment, a device obtains client attribute data for clients of an online application that access the online application via a plurality of points of presence in a network. The device forms a performance model that models an application experience metric for the online application as a function of the client attribute data for each of the plurality of points of presence. The device selects, using the performance model, a particular point of presence from among the plurality of points of presence to be used by a particular client to access the online application, based on its client attribute data. The device causes the particular client to access the online application via the particular point of presence selected by the device using the performance model.

20 Claims, 13 Drawing Sheets

SASE POP SELECTION BASED ON CLIENT FEATURES

TECHNICAL FIELD

The present disclosure relates generally to computer networks, and, more particularly, to secure access service edge (SASE) point of presence (POP) selection based on client features.

BACKGROUND

Secure Access Service Edge (SASE) has emerged in the past few years as an important trend and concept in security and networking. In general, SASE is a network architecture whereby WAN and security are provided jointly as a service, through the use of secure gateways that combine WAN access and cloud-delivered firewalls and security. The overall intent of a SASE is to simplify the network architecture, by connecting all locations to a SASE gateway managed by a provider, such as Cisco Umbrella by Cisco Systems, Inc. The SASE gateway is then responsible for all security policies, as well as for providing WAN connectivity.

The SASE model is attractive in that it offers a simplified architecture. However, it does not come without challenges. For instance, the closest point of presence (PoP) of the SASE provider is often selected based on its location and proximity to the edge device connecting to it, under the assumption that this PoP offers the best performance, which is not always the case. Indeed, performance of the PoP used to access a cloud-hosted application can change over time, leading to decreased performance and lowered quality of experience for the user.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1A:
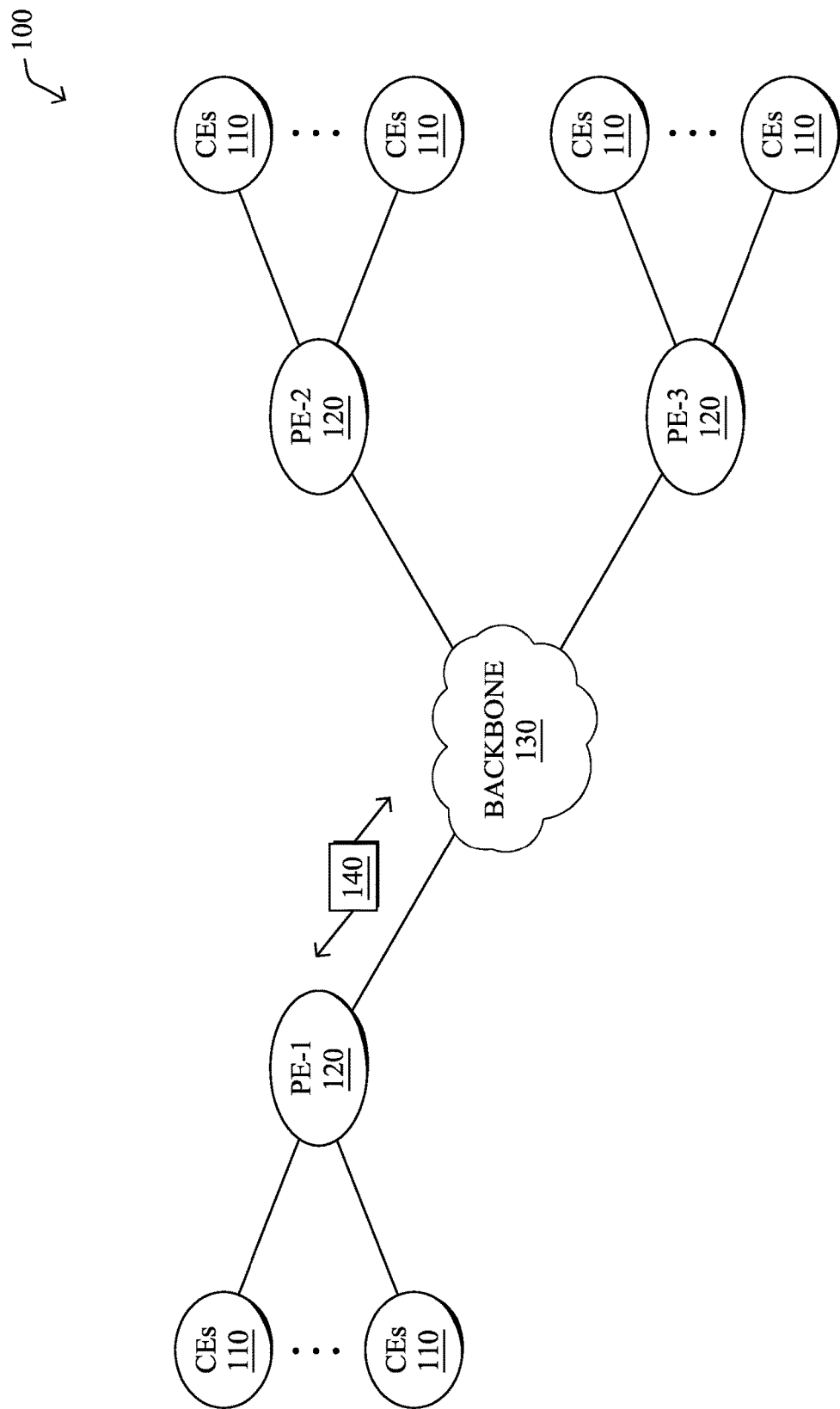
FIGS. 1A-1B illustrate an example communication network.

According to one or more embodiments of the disclosure, a device obtains client attribute data for clients of an online application that access the online application via a plurality of points of presence in a network. The device forms a performance model that models an application experience metric for the online application as a function of the client attribute data for each of the plurality of points of presence. The device selects, using the performance model, a particular point of presence from among the plurality of points of presence to be used by a particular client to access the online application, based on its client attribute data. The device causes the particular client to access the online application via the particular point of presence selected by the device using the performance model.

Description

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/5G/LTE backup connection). For example, a particular CE router 110 shown in network 100 may support a given customer site, potentially also with a backup link, such as a wireless connection.

2.) Site Type B: a site connected to the network by the CE router via two primary links (e.g., from different Service Providers), with potentially a backup link (e.g., a 3G/4G/5G/LTE connection). A site of type B may itself be of different types:

2a.) Site Type B1: a site connected to the network using two MPLS VPN links (e.g., from different Service Providers), with potentially a backup link (e.g., a 3G/4G/5G/LTE connection).

2b.) Site Type B2: a site connected to the network using one MPLS VPN link and one link connected to the public Internet, with potentially a backup link (e.g., a 3G/4G/5G/LTE connection). For example, a particular customer site may be connected to network 100 via PE-3 and via a separate Internet connection, potentially also with a wireless backup link.

2c.) Site Type B3: a site connected to the network using two links connected to the public Internet, with potentially a backup link (e.g., a 3G/4G/5G/LTE connection).

Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/5G/LTE backup link). For example, a particular customer site may include a first CE router 110 connected to PE-2 and a second CE router 110 connected to PE-3.

Figure 1B:
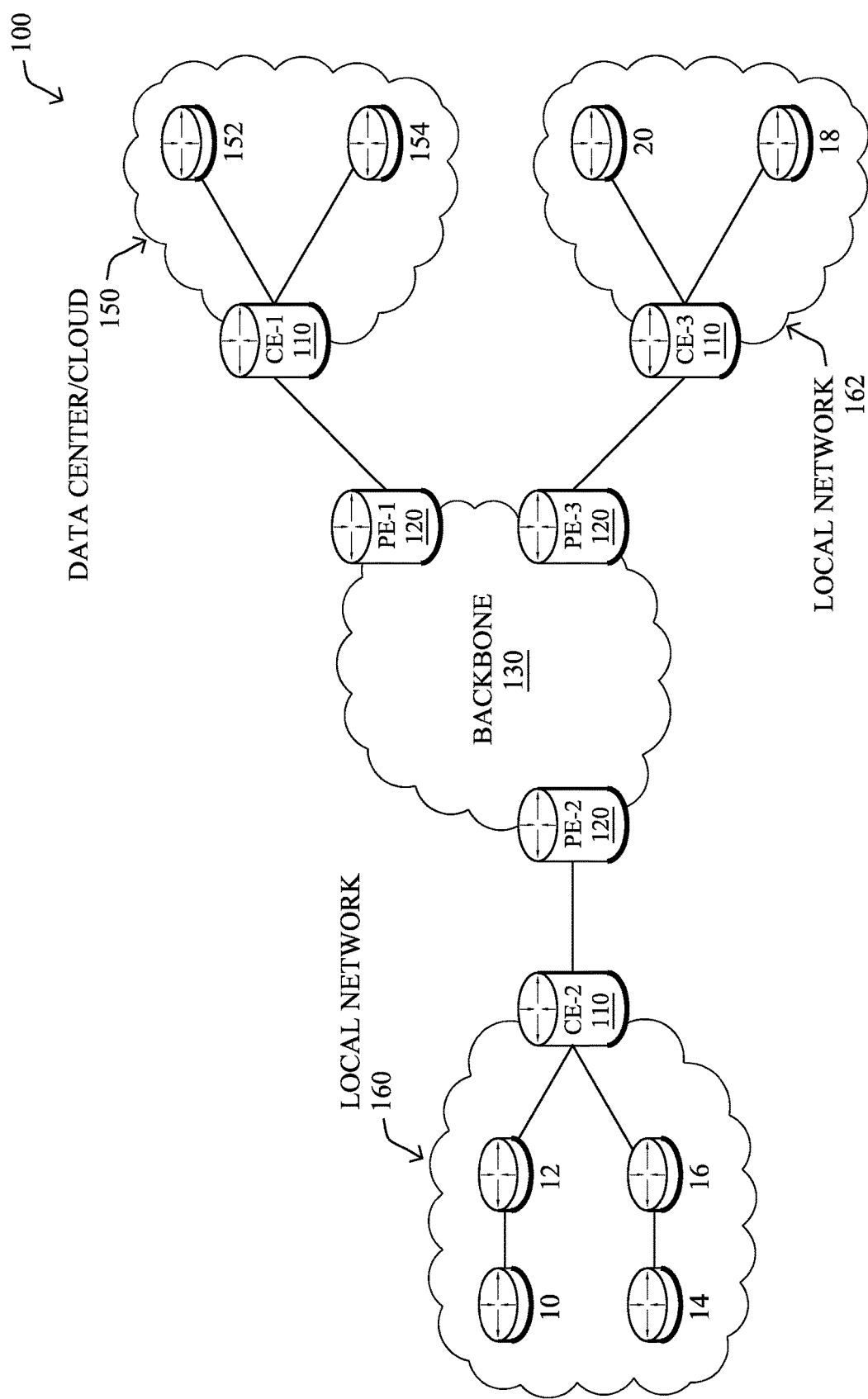

FIG. 1B illustrates an example of network 100 in greater detail, according to various embodiments. As shown, network backbone 130 may provide connectivity between devices located in different geographical areas and/or different types of local networks. For example, network 100 may comprise local/branch networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

In some embodiments, the techniques herein may be applied to other network topologies and configurations. For example, the techniques herein may be applied to peering points with high-speed links, data centers, etc.

According to various embodiments, a software-defined WAN (SD-WAN) may be used in network 100 to connect local network 160, local network 162, and data center/cloud environment 150. In general, an SD-WAN uses a software defined networking (SDN)-based approach to instantiate tunnels on top of the physical network and control routing decisions, accordingly. For example, as noted above, one tunnel may connect router CE-2 at the edge of local network 160 to router CE-1 at the edge of data center/cloud environment 150 over an MPLS or Internet-based service provider network in backbone 130. Similarly, a second tunnel may also connect these routers over a 4G/5G/LTE cellular service provider network. SD-WAN techniques allow the WAN functions to be virtualized, essentially forming a virtual connection between local network 160 and data center/cloud environment 150 on top of the various underlying connections. Another feature of SD-WAN is centralized management by a supervisory service that can monitor and adjust the various connections, as needed.

Figure 2:
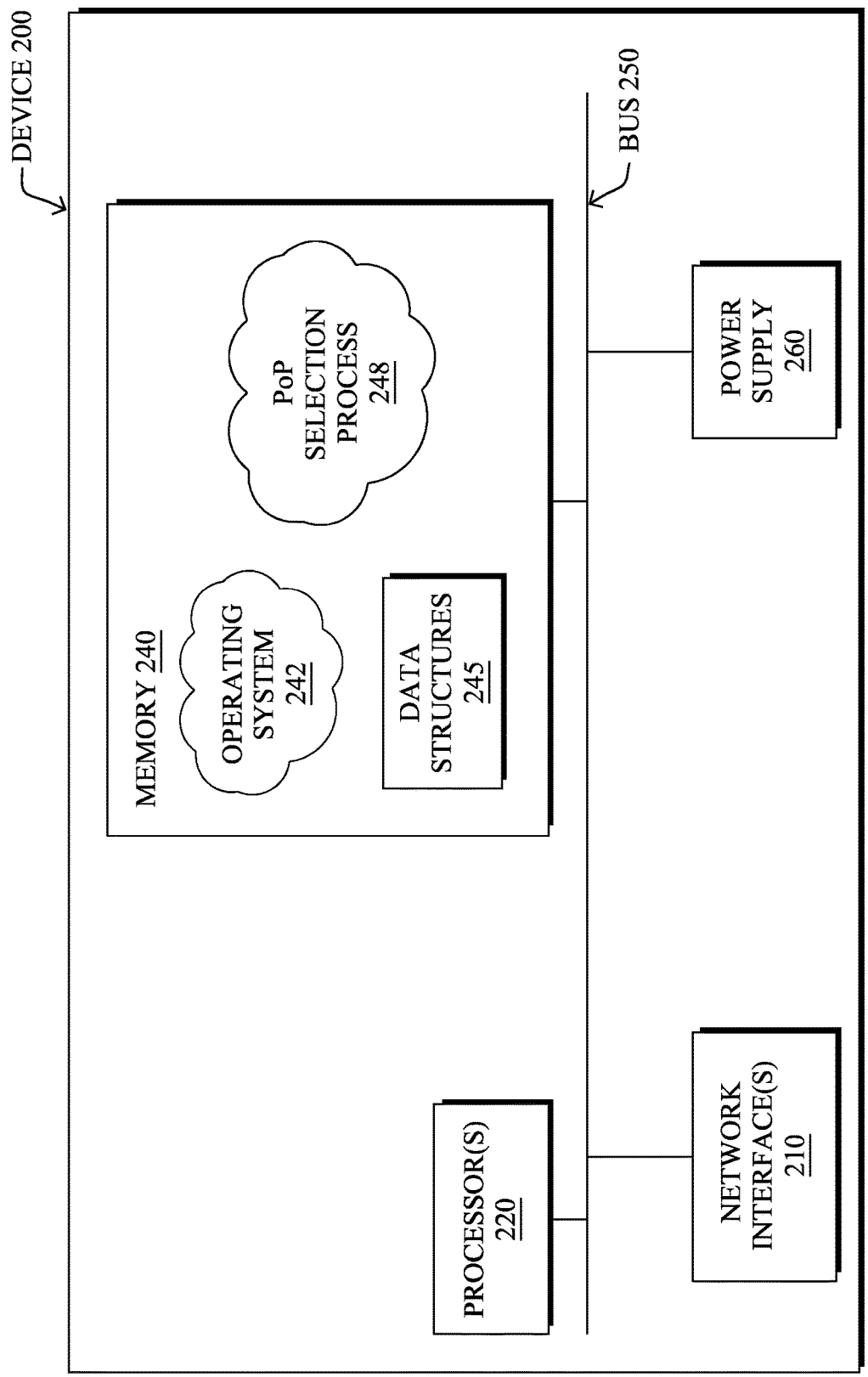
FIG. 2 illustrates an example network device/node.

FIG. 2 is a schematic block diagram of an example node/device 200 (e.g., an apparatus) that may be used with one or more embodiments described herein, e.g., as any of the computing devices shown in FIGS. 1A-1B, particularly the PE routers 120, CE routers 110, nodes/device 10-20, servers 152-154 (e.g., a network controller/supervisory service located in a data center, etc.), any other computing device that supports the operations of network 100 (e.g., switches, etc.), or any of the other devices referenced below. The device 200 may also be any other suitable type of device depending upon the type of network architecture in place, such as IoT nodes, etc. Device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise a point of presence (PoP) selection process 248, as described herein, any of which may alternatively be located within individual network interfaces.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

In various embodiments, as detailed further below, PoP selection process 248 may also include computer executable instructions that, when executed by processor(s) 220, cause device 200 to perform the techniques described herein. To do so, in some embodiments, PoP selection process 248 may utilize machine learning. In general, machine learning is concerned with the design and the development of techniques that take as input empirical data (such as network statistics and performance indicators), and recognize complex patterns in these data. One very common pattern among machine learning techniques is the use of an underlying model M, whose parameters are optimized for minimizing the cost function associated to M, given the input data. For instance, in the context of classification, the model M may be a straight line that separates the data into two classes (e.g., labels) such that $M=a*x+b*y+c$ and the cost function would be the number of misclassified points. The learning process then operates by adjusting the parameters a, b, c such that the number of misclassified points is minimal. After this optimization phase (or learning phase), the model M can be used very easily to classify new data points. Often, M is a statistical model, and the cost function is inversely proportional to the likelihood of M, given the input data.

In various embodiments, PoP selection process 248 may employ one or more supervised, unsupervised, or semi-supervised machine learning models. Generally, supervised learning entails the use of a training set of data, as noted above, that is used to train the model to apply labels to the input data. For example, the training data may include sample telemetry that has been labeled as being indicative of an acceptable performance or unacceptable performance. On the other end of the spectrum are unsupervised techniques that do not require a training set of labels. Notably, while a supervised learning model may look for previously seen patterns that have been labeled as such, an unsupervised model may instead look to whether there are sudden changes or patterns in the behavior of the metrics. Semi-supervised learning models take a middle ground approach that uses a greatly reduced set of labeled training data.

Example machine learning techniques that PoP selection process 248 can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), logistic or other regression, Markov models or chains, principal component analysis (PCA) (e.g., for linear models), singular value decomposition (SVD), multi-layer perceptron (MLP) artificial neural networks (ANNs) (e.g., for non-linear models), replicating reservoir networks (e.g., for non-linear models, typically for time series), random forest classification, or the like.

The performance of a machine learning model can be evaluated in a number of ways based on the number of true positives, false positives, true negatives, and/or false negatives of the model. For example, consider the case of a model that predicts whether a network path will satisfy the service level agreement (SLA) of the traffic on that path. In such a case, the false positives of the model may refer to the number of times the model incorrectly predicted that the particular network path will not satisfy the SLA of the traffic on that path. Conversely, the false negatives of the model may refer to the number of times the model incorrectly predicted that the path would exhibit acceptable performance. True negatives and positives may refer to the number of times the model correctly predicted acceptable path performance or an SLA violation, respectively. Related to these measurements are the concepts of recall and precision. Generally, recall refers to the ratio of true positives to the sum of true positives and false negatives, which quantifies the sensitivity of the model. Similarly, precision refers to the ratio of true positives the sum of true and false positives.

As noted above, in software defined WANs (SD-WANs), traffic between individual sites are sent over tunnels. The tunnels are configured to use different switching fabrics, such as MPLS, Internet, 4G or 5G, etc. Often, the different switching fabrics provide different QoS at varied costs. For example, an MPLS fabric typically provides high QoS when compared to the Internet, but is also more expensive than traditional Internet. Some applications requiring high QoS (e.g., video conferencing, voice calls, etc.) are traditionally sent over the more costly fabrics (e.g., MPLS), while applications not needing strong guarantees are sent over cheaper fabrics, such as the Internet.

Traditionally, network policies map individual applications to Service Level Agreements (SLAs), which define the satisfactory performance metric(s) for an application, such as loss, latency, or jitter. Similarly, a tunnel is also mapped to the type of SLA that is satisfies, based on the switching fabric that it uses. During runtime, the SD-WAN edge router then maps the application traffic to an appropriate tunnel. Currently, the mapping of SLAs between applications and tunnels is performed manually by an expert, based on their experiences and/or reports on the prior performances of the applications and tunnels.

The emergence of infrastructure as a service (IaaS) and software as a service (SaaS) is having a dramatic impact of the overall Internet due to the extreme virtualization of services and shift of traffic load in many large enterprises. Consequently, a branch office or a campus can trigger massive loads on the network.

Figure 3A:
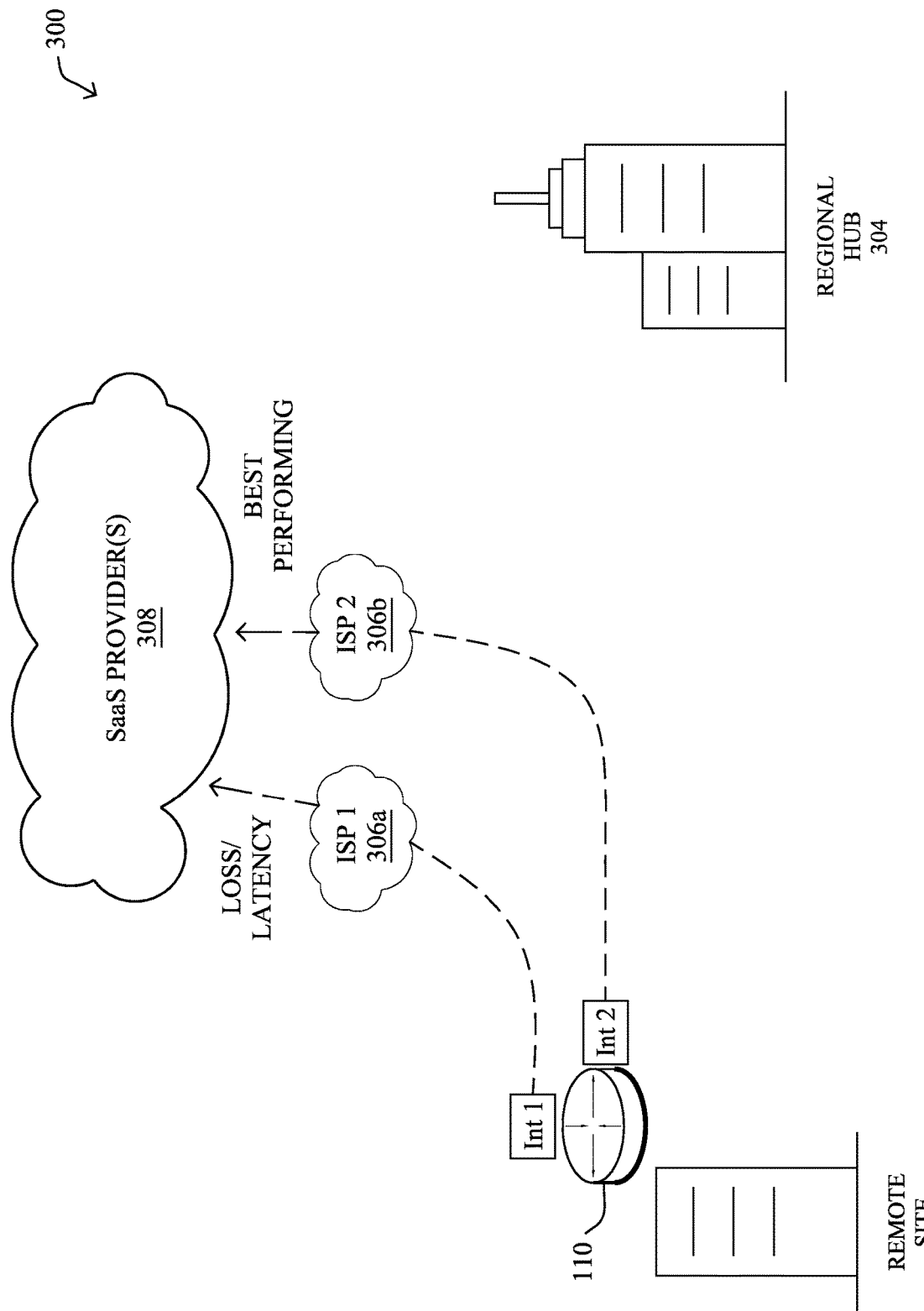
FIGS. 3A-3B illustrate example network deployments.
Figure 3B:
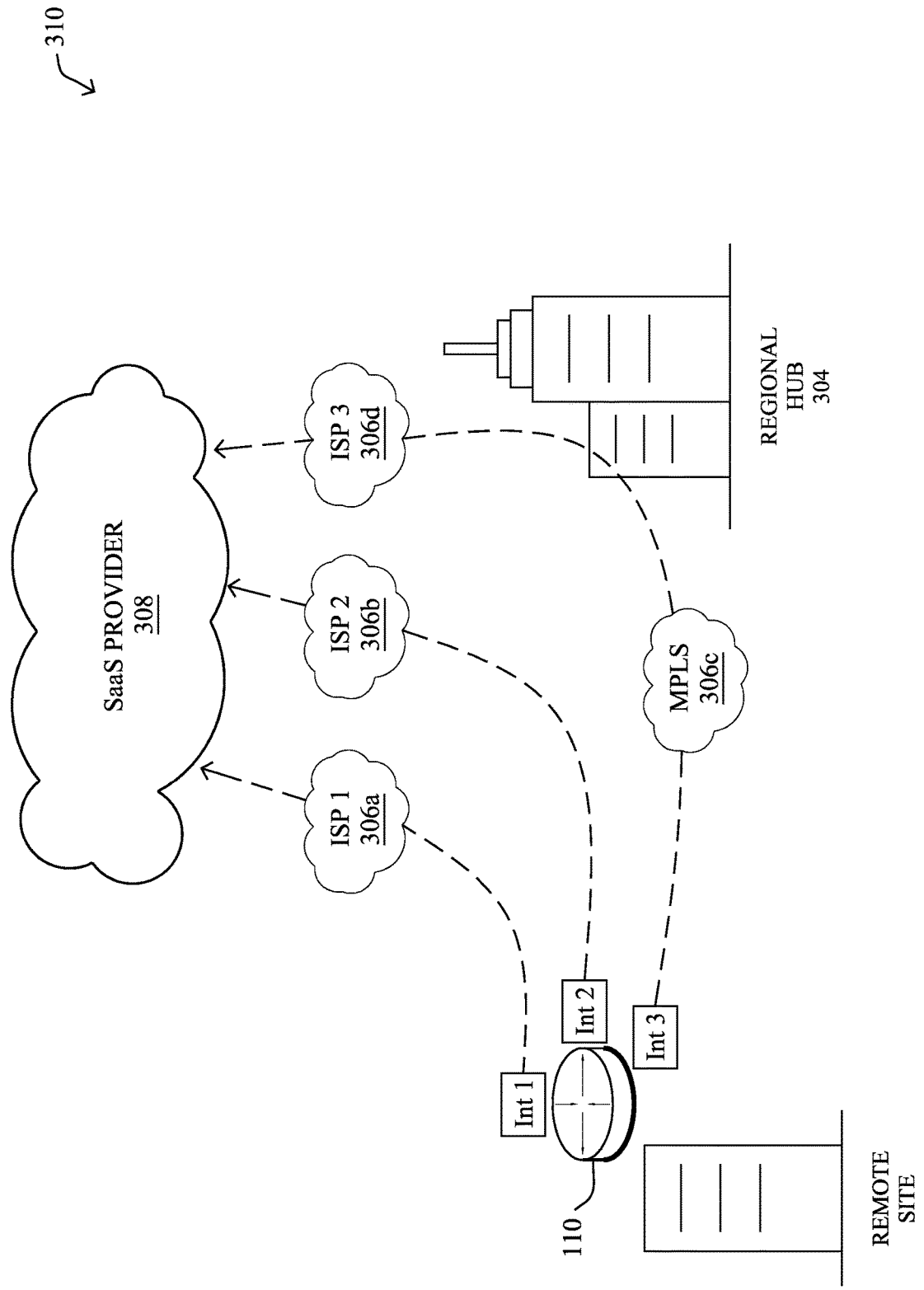

FIGS. 3A-3B illustrate example network deployments 300, 310, respectively. As shown, a router 110 (e.g., a device 200) located at the edge of a remote site 302 may provide connectivity between a local area network (LAN) of the remote site 302 and one or more cloud-based, SaaS providers 308. For example, in the case of an SD-WAN, router 110 may provide connectivity to SaaS provider(s) 308 via tunnels across any number of networks 306. This allows clients located in the LAN of remote site 302 to access cloud applications (e.g., Office 365™, Dropbox™, etc.) served by SaaS provider(s) 308.

As would be appreciated, SD-WANs allow for the use of a variety of different pathways between an edge device and an SaaS provider. For example, as shown in example network deployment 300 in FIG. 3A, router 110 may utilize two Direct Internet Access (DIA) connections to connect with SaaS provider(s) 308. More specifically, a first interface of router 110 (e.g., a network interface 210, described previously), Int 1, may establish a first communication path (e.g., a tunnel) with SaaS provider(s) 308 via a first Internet Service Provider (ISP) 306a, denoted ISP 1 in FIG. 3A. Likewise, a second interface of router 110, Int 2, may establish a backhaul path with SaaS provider(s) 308 via a second ISP 306b, denoted ISP 2 in FIG. 3A.

FIG. 3B illustrates another example network deployment 310 in which Int 1 of router 110 at the edge of remote site 302 establishes a first path to SaaS provider(s) 308 via ISP 1 and Int 2 establishes a second path to SaaS provider(s) 308 via a second ISP 306b. In contrast to the example in FIG. 3A, Int 3 of router 110 may establish a third path to SaaS provider(s) 308 via a private corporate network 306c (e.g., an MPLS network) to a private data center or regional hub 304 which, in turn, provides connectivity to SaaS provider(s) 308 via another network, such as a third ISP 306d.

Regardless of the specific connectivity configuration for the network, a variety of access technologies may be used (e.g., ADSL. 4G, 5G, etc.) in all cases, as well as various networking technologies (e.g., public Internet, MPLS (with or without strict SLA), etc.) to connect the LAN of remote site 302 to SaaS provider(s) 308. Other deployments scenarios are also possible, such as using Colo, accessing SaaS provider(s) 308 via Zscaler or Umbrella services, and the like.

Figure 4A:
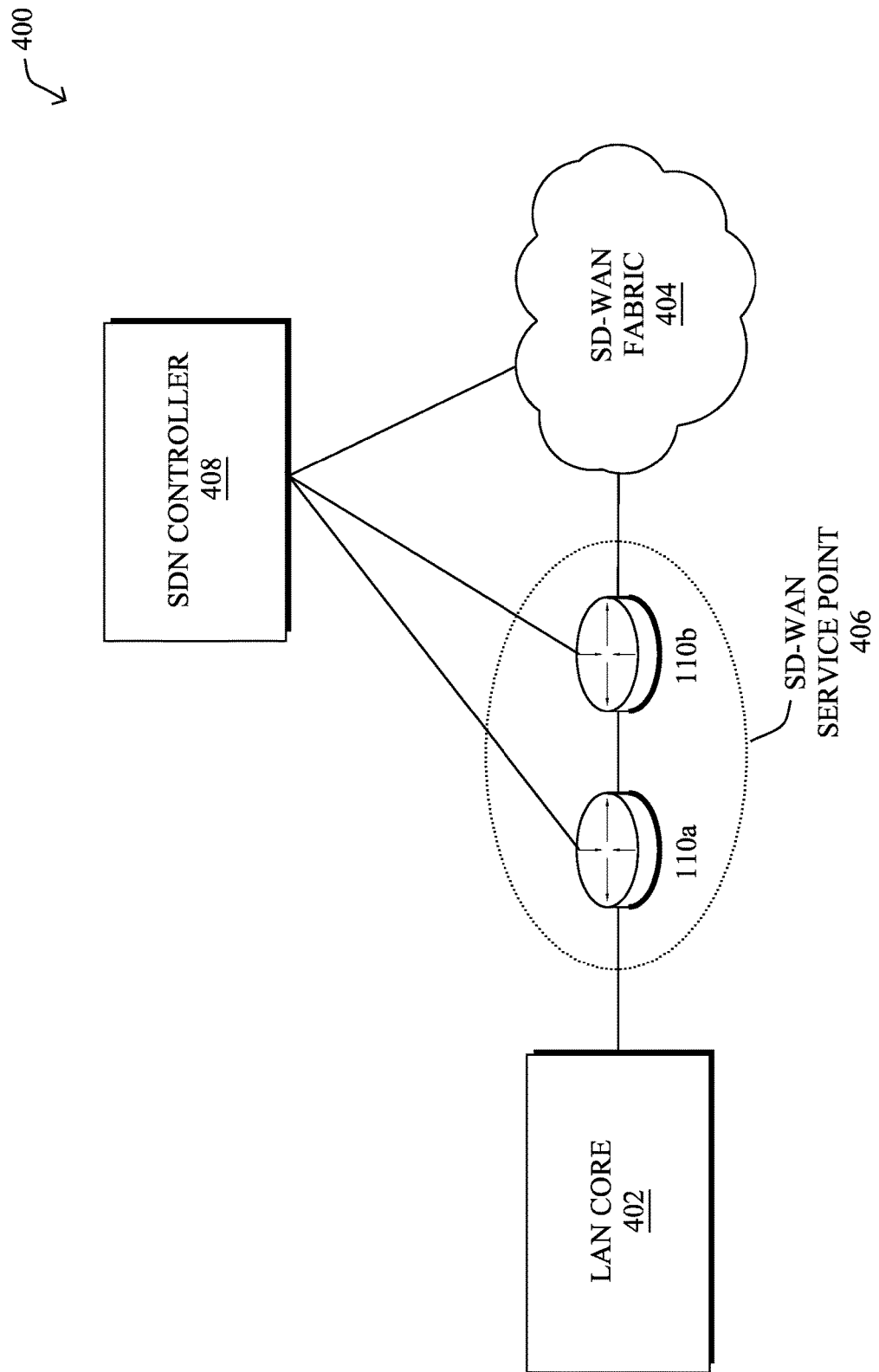
FIGS. 4A-4B illustrate example software defined network (SDN) implementations.

FIG. 4A illustrates an example SDN implementation 400, according to various embodiments. As shown, there may be a LAN core 402 at a particular location, such as remote site 302 shown previously in FIGS. 3A-3B. Connected to LAN core 402 may be one or more routers that form an SD-WAN service point 406 which provides connectivity between LAN core 402 and SD-WAN fabric 404. For instance. SD-WAN service point 406 may comprise routers 110a-110b.

Overseeing the operations of routers 110a-110b in SD-WAN service point 406 and SD-WAN fabric 404 may be an SDN controller 408. In general, SDN controller 408 may comprise one or more devices (e.g., devices 200) configured to provide a supervisory service, typically hosted in the cloud, to SD-WAN service point 406 and SD-WAN fabric 404. For instance. SDN controller 408 may be responsible for monitoring the operations thereof, promulgating policies (e.g., security policies, etc.), installing or adjusting IPsec routes/tunnels between LAN core 402 and remote destinations such as regional hub 304 and/or SaaS provider(s) 308 in FIGS. 3A-3B, and the like.

As noted above, a primary networking goal may be to design and optimize the network to satisfy the requirements of the applications that it supports. So far, though, the two worlds of "applications" and "networking" have been fairly siloed. More specifically, the network is usually designed in order to provide the best SLA in terms of performance and reliability, often supporting a variety of Class of Service (CoS), but unfortunately without a deep understanding of the actual application requirements. On the application side, the networking requirements are often poorly understood even for very common applications such as voice and video for which a variety of metrics have been developed over the past two decades, with the hope of accurately representing the Quality of Experience (QoE) from the standpoint of the users of the application.

More and more applications are moving to the cloud and many do so by leveraging an SaaS model. Consequently, the number of applications that became network-centric has grown approximately exponentially with the raise of SaaS applications, such as Office 365, ServiceNow, SAP, voice, and video, to mention a few. All of these applications rely heavily on private networks and the Internet, bringing their own level of dynamicity with adaptive and fast changing workloads. On the network side, SD-WAN provides a high degree of flexibility allowing for efficient configuration management using SDN controllers with the ability to benefit from a plethora of transport access (e.g., MPLS, Internet with supporting multiple CoS, LTE, satellite links, etc.), multiple classes of service and policies to reach private and public networks via multi-cloud SaaS.

Furthermore, the level of dynamicity observed in today's network has never been so high. Millions of paths across thousands of Service Provides (SPs) and a number of SaaS applications have shown that the overall QoS(s) of the network in terms of delay, packet loss, jitter, etc. drastically vary with the region, SP, access type, as well as over time with high granularity. The immediate consequence is that the environment is highly dynamic due to:

New in-house applications being deployed;
New SaaS applications being deployed everywhere in the network, hosted by a number of different cloud providers;
Internet, MPLS. LTE transports providing highly varying performance characteristics, across time and regions;
SaaS applications themselves being highly dynamic: it is common to see new servers deployed in the network. DNS resolution allows the network for being informed of a new server deployed in the network leading to a new destination and a potentially shift of traffic towards a new destination without being even noticed.

According to various embodiments, application aware routing usually refers to the ability to rout traffic so as to satisfy the requirements of the application, as opposed to exclusively relying on the (constrained) shortest path to reach a destination IP address. Various attempts have been made to extend the notion of routing, CSPF, link state routing protocols (ISIS, OSPF, etc.) using various metrics (e.g., Multi-topology Routing) where each metric would reflect a different path attribute (e.g., delay, loss, latency, etc.), but each time with a static metric. At best, current approaches rely on SLA templates specifying the application requirements so as for a given path (e.g., a tunnel) to be "eligible" to carry traffic for the application. In turn, application SLAs are checked using regular probing. Other solutions compute a metric reflecting a particular network characteristic (e.g., delay, throughput, etc.) and then selecting the supposed 'best path,' according to the metric.

The term 'SLA failure' refers to a situation in which the SLA for a given application, often expressed as a function of delay, loss, or jitter, is not satisfied by the current network path for the traffic of a given application. This leads to poor QoE from the standpoint of the users of the application. Modern SaaS solutions like Viptela, CloudonRamp SaaS, and the like, allow for the computation of per application QoE by sending HyperText Transfer Protocol (HTTP) probes along various paths from a branch office and then route the application's traffic along a path having the best QoE for the application. At a first sight, such an approach may solve many problems. Unfortunately, though, there are several shortcomings to this approach:

- The SLA for the application is 'guessed,' using static thresholds.
- Routing is still entirely reactive: decisions are made using probes that reflect the status of a path at a given time, in contrast with the notion of an informed decision.
- SLA failures are very common in the Internet and a good proportion of them could be avoided (e.g., using an alternate path), if predicted in advance.

Figure 4B:
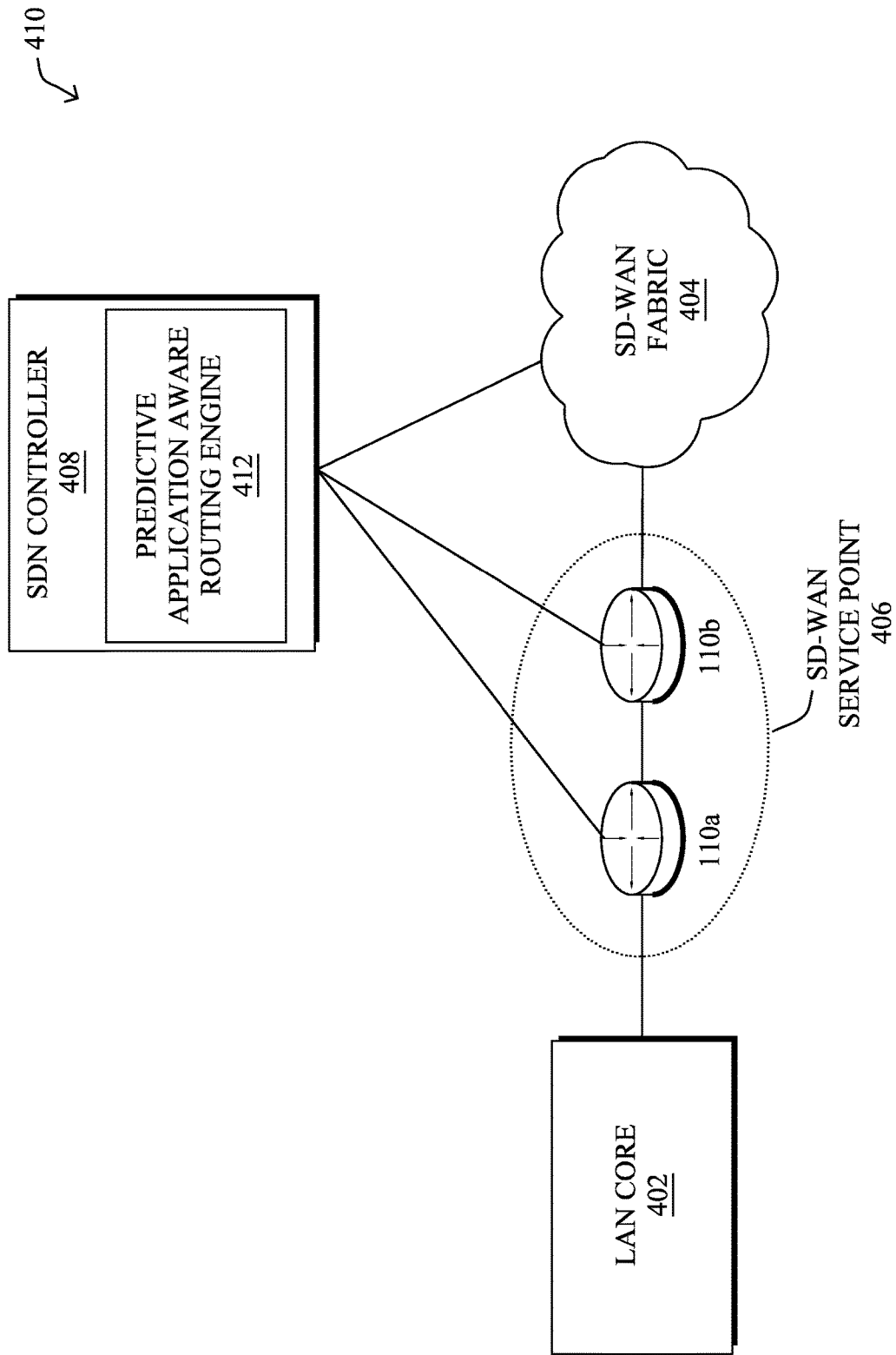

In various embodiments, the techniques herein allow for a predictive application aware routing engine to be deployed, such as in the cloud, to control routing decisions in a network. For instance, the predictive application aware routing engine may be implemented as part of an SDN controller (e.g., SDN controller 408) or other supervisory service, or may operate in conjunction therewith. For instance, FIG. 4B illustrates an example 410 in which SDN controller 408 includes a predictive application aware routing engine 412. Further embodiments provide for predictive application aware routing engine 412 to be hosted on a router 110 or at any other location in the network.

During execution, predictive application aware routing engine 412 makes use of a high volume of network and application telemetry (e.g., from routers 110a-110b, SD-WAN fabric 404, etc.) so as to compute statistical and/or machine learning models to control the network with the objective of optimizing the application experience and reducing potential down times. To that end, predictive application aware routing engine 412 may compute a variety of models to understand application requirements, and predictably route traffic over private networks and/or the Internet, thus optimizing the application experience while drastically reducing SLA failures and downtimes.

In other words, predictive application aware routing engine 412 may first predict SLA violations in the network that could affect the QoE of an application (e.g., due to spikes of packet loss or delay, sudden decreases in bandwidth, etc.). In turn, predictive application aware routing engine 412 may then implement a corrective measure, such as rerouting the traffic of the application, prior to the predicted SLA violation. For instance, in the case of video applications, it now becomes possible to maximize throughput at any given time, which is of utmost importance to maximize the QoE of the video application. Optimized throughput can then be used as a service triggering the routing decision for specific application requiring highest throughput, in one embodiment.

As would be appreciated, modern SaaS applications are typically delivered globally via public cloud infrastructure using cloud native services. Even though public cloud providers may have a high number of points of presence (PoPs) and use those to deliver the application, globally. Still, testing has shown that user quality of experience (QoE) may vary greatly based on the location of the user. This is because all public cloud providers are delivering services which are region-based and applications are running in specific region(s) and location(s). Indeed, even though it might seem that an online application is global (e.g., because of its use of globally-available CloudFront POPs, etc.), in reality it might run in a single region/location and user experience might vary greatly based on the location.

To determine the QoE for a particular SaaS application, various approaches are possible such as:
- Obtaining user feedback directly from the application
- Applying traffic analytics, such as by analyzing Netflow records that include extra metrics like Application Response Time (ART)
- Sending synthetic path probes to measure networking metrics to each SaaS application from each location. These probes are 'synthetic' in that they seek to mimic the actual characteristics of the traffic of the application under scrutiny.

The first approach above is rarely used today because of its complexity, but can still be used with the techniques herein. Note that relying on direct user feedback to drive routing decisions would also require supporting application programming interfaces (APIs) and the relevant network telemetry, in order to optimize the routing. The second and third approaches above are well-suited for use in Secure Access Service Edge (SASE)/SD-WAN implementations.

In various embodiments, predictive application aware routing engine 412 may make use of any or all of the above approaches. For instance, predictive application aware routing engine 412 may make use of an API for a particular online application, allowing it to obtain application experience/QoE metrics directly from the application. Such metrics may be combined with probing results and/or path telemetry. This is in sharp contrast to network-centric approaches that do not necessarily reflect the true user experience.

As noted above, Secure Access Service Edge (SASE) has emerged in the past few years as an important trend and concept in security and networking. In general, SASE is a network architecture whereby WAN and security are provided jointly as a service, through the use of secure gateways that combine WAN access and cloud-delivered firewalls and security. The overall intent of a SASE is to simplify the network architecture, by connecting all locations to a SASE gateway managed by a provider, such as Cisco Umbrella by Cisco Systems, Inc. The SASE gateway is then responsible for all security policies, as well as for providing WAN connectivity.

SASE providers host their gateways in points of presence (PoPs) around the world, and locations are usually connected to the closest PoP, either in purely geographical terms, or in terms of routing topology using AnyCast. To do so, the location typically establishes a simple, unique, and secure tunnel to the corresponding PoP, and all traffic is sent to the provider.

Figure 5:
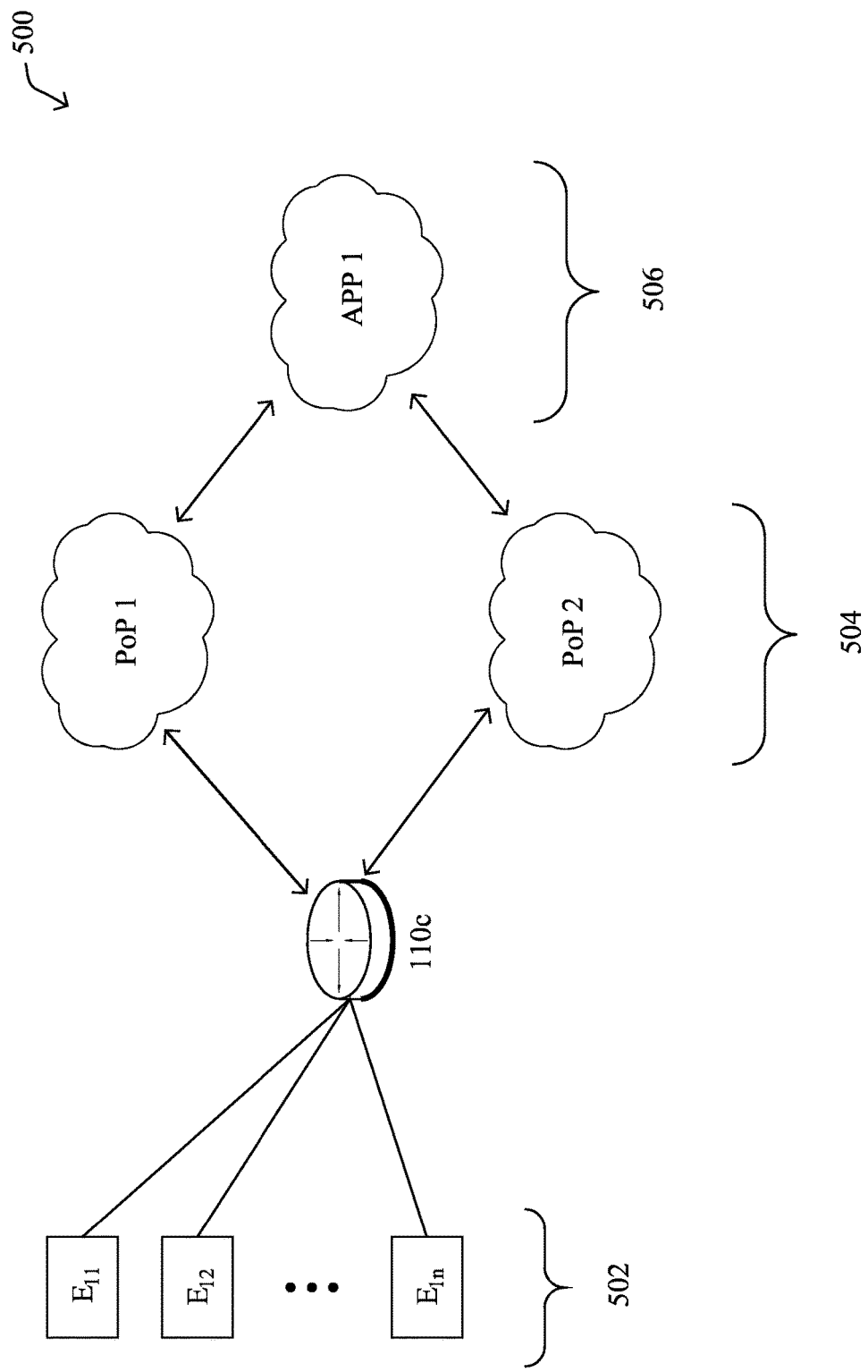
FIG. 5 illustrates an example of an edge router connecting to a cloud-hosted application via multiple points of presence (PoPs)

FIG. 5 illustrates an example 500 of an edge router 110c accessing a cloud-hosted application 506. As shown, assume that there are n-number of endpoints 502 at a particular location for which edge router 110c provides external connectivity. Under a SASE model, a SASE provider may maintain any number of PoPs 504 to which edge router 110c may connect. Accordingly, edge router 110c may access a cloud-hosted application 506, such as an SaaS application, via a first PoP among PoPs 504, a second PoP among PoPs 504, etc.

Although SASE is an attractive model, there are practical challenges. The benefits of SASE usually only focus on security and simplicity of use, while performance is not guaranteed. Indeed, ensuring that traffic SLAs are met may require adjustments that decrease the value of the SASE model:
- To meet SLAs, exceptions might be required for traffic that should not be sent through the gateway but directly sent via Direct Internet Access (DIA) locally, in case the gateway is not able to provide a good enough performance for a specific kind of traffic, which highly depends on Peering between the SASE Gateway PoP and SaaS provider or intermediate Autonomous Systems (AS). For instance, it is sometimes recommended to send out VoIP traffic directly DIA to achieve better performance. However, this defeats the purpose of delivering WAN and security directly in the cloud while relying only on a very simple unique tunnel from all locations.

Selection of the "closest PoP" is usually based on either geo-location, AnyCast (e.g., for secure web gateways relying on HTTPS proxies), probing results (e.g., selecting the PoP with the lowest latency), or by fixing a static PoP location (e.g., as is usually done when setting up fixed IPsec tunnels). However, SASE providers tend to have rather dense sets of PoPs to which a location can connect. Thus, the closest PoP is not always the best one to use, in terms of providing the best possible application experience. In particular, a PoP might be struggling at certain times of the day to satisfy the SLA of the application traffic, while other nearby PoPs might not.

The performance of a given PoP can also vary between applications. Indeed, performance can be influenced by any or all of the following factors:
Edge to PoP.
PoP load.
PoP to PoP, if traffic is sent through a backbone.
PoP to SaaS. Different PoPs might have different types of inter-connect or peering with SaaS services, and might end up going to different SaaS physical endpoints, even if the SaaS exposes a single logical endpoint.

Figure 6A:
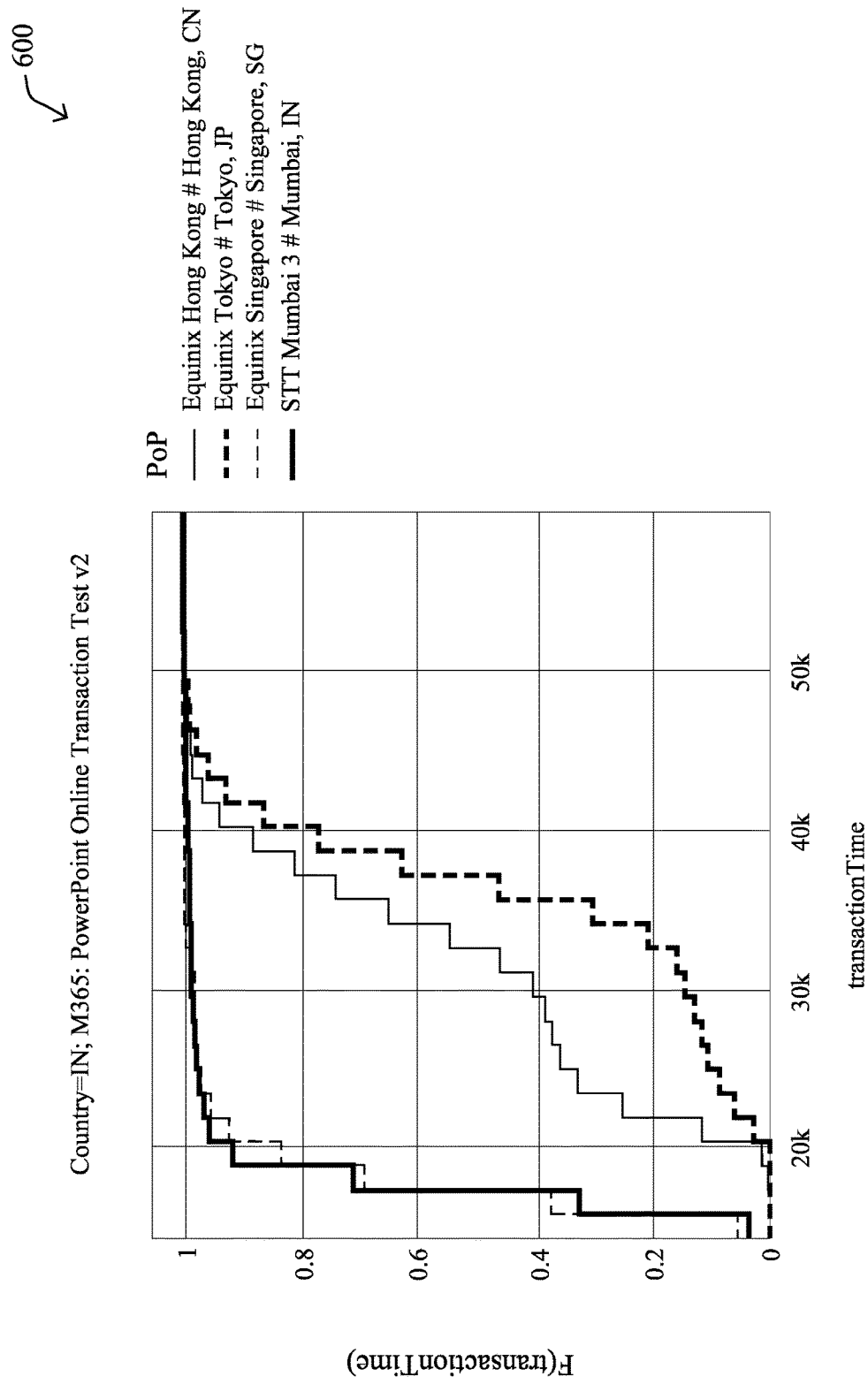
FIGS. 6A-6D illustrate example plots comparing application experience metrics for different PoPs.

By way of example, FIGS. 6A-6D illustrate example plots comparing application experience metrics for different PoPs. For instance, FIG. 6A illustrates a plot 600 showing the transaction time distributions for clients connecting from India (IN) to Office365 PowerPoint via four different PoPs: Equinix Hong Kong, Equinix Tokyo, Equinix Singapore, and STT Mumbai. Here, the transaction time is being used as the application experience metric. As can be seen, the transaction time distribution for PoPs Equinix Singapore and STT Mumbai 3 are much better (median <17 s) than the transaction times for Equinix Hong Kong and Equinix Tokyo (median >32 s). Hence, for clients in India, it is much better to connect to Equinix Singapore or STT Mumbai 3.

Figure 6B:
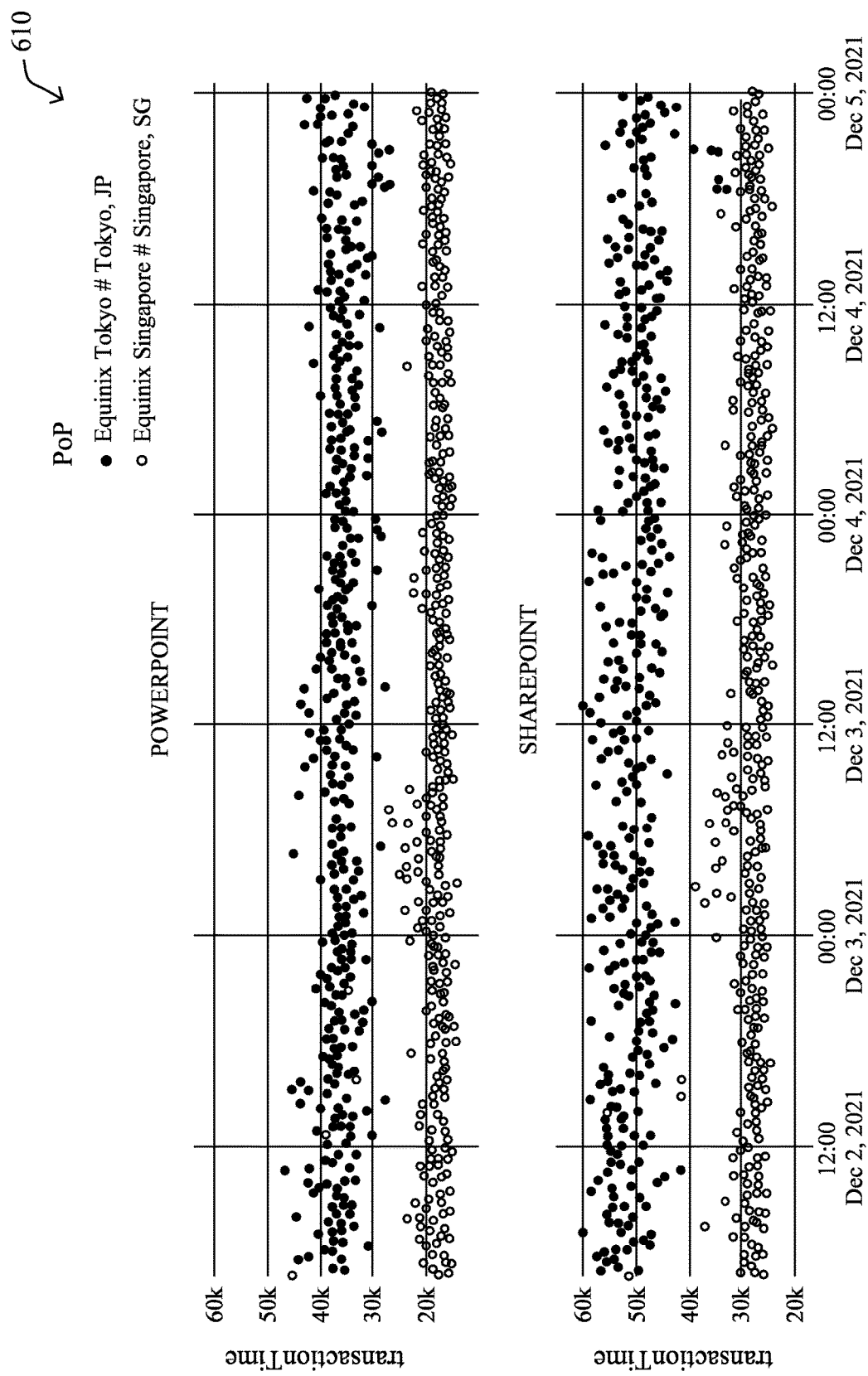

FIG. 6B illustrates a plot 610 of the timeseries of transaction times for two applications, PowerPoint and SharePoint from an agent in India via two PoPs: one located in Tokyo and another in Singapore. In order to compare the two, the agent switched PoPs every fifteen minutes during the test. As can be seen, the PoP located in Singapore has much lower transaction times than that of the PoP in Tokyo, with very little variation in these differences over various days and times of day.

Figure 6D:
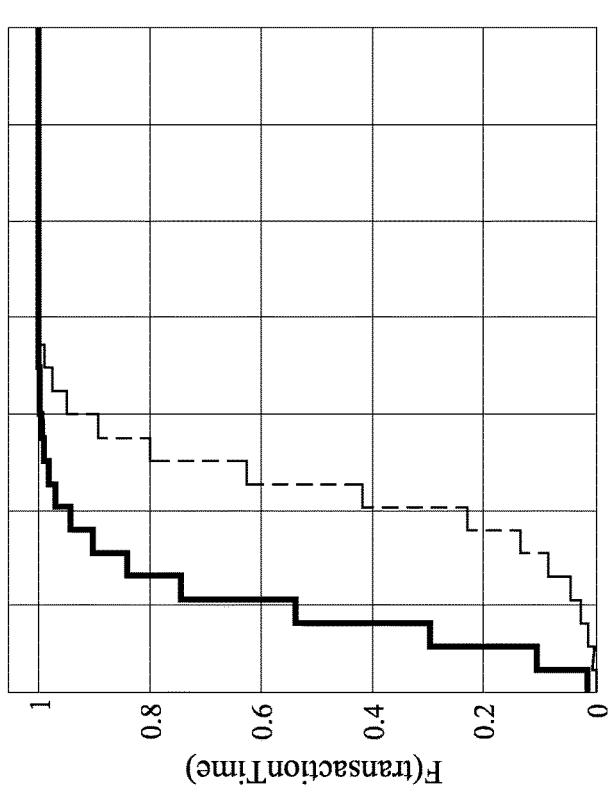
Figure 6C:
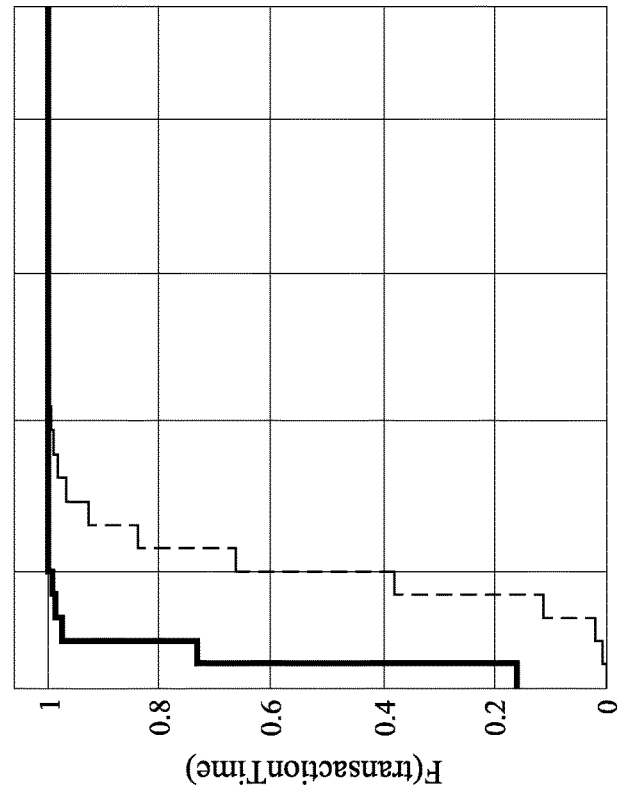

FIG. 6C illustrates a plot 620 of the transaction time distributions for a client located in Japan (JP) connecting to PowerPoint via two different PoPs: one located in Singapore and another located in Tokyo. Similarly, FIG. 6D illustrates a plot 630 of the transaction time distributions for a client located in the United Arab Emirates (UAE) connecting to PowerPoint via those same PoPs. From these, the differences in transaction times clearly suggest that a few PoPs are better than other PoPs.

There can be several reasons for such a discrepancy in application experience across PoPs. First, the nearest PoP may be congested or may induce detrimental network effect such as queuing delays, loss or jitter. Second, even if few probes measure the network metrics, they can still be transient. When the client connects, the application traffic may experience network conditions that was not measured by those few probes. Finally, the nature of the probes (e.g., small 64 byte packets) may not be representative for the application traffic. For example, the probing result may indicate a smaller delay, but a heavier application traffic may face congestion, loss and larger delay. Hence, relying on simple associations of client to PoP often leads to bad application experience. In addition, the application experience afforded by using a certain PoP can also vary over time.

SASE PoP Selection Based on Client Features

The techniques herein introduce systems and data-driven methods to determine, for each application, the best PoP for a given client, based on attributes of that client. In some aspects, these client attributes may include geolocation information for the client (e.g., its site, city, region, country, etc.), service provider, temporal features, s combinations thereof, or the like. An application experience metric is learned from preexisting data on how clients with such attributes has performed across multiple PoPs. In other aspects, the techniques herein also introduce message passing mechanisms for SASE implementations, to push the best PoPs to the clients either periodically or reactively upon observing some change. In another aspect, the techniques herein also introduce user interfaces whereby an administrator can control the PoP selection process, such as by specifying which parameters should be considered for the selection. In a further aspect, the techniques herein also introduce mechanisms to monitor for changes in the 'best' PoP for a client over time.

Illustratively, the techniques described herein may be performed by hardware, software, and/or firmware, such as in accordance with PoP selection process 248, which may include computer executable instructions executed by the processor 220 (or independent processor of interfaces 210) to perform functions relating to the techniques described herein.

Specifically, according to various embodiments, a device obtains client attribute data for clients of an online application that access the online application via a plurality of points of presence in a network. The device forms a performance model that models an application experience metric for the online application as a function of the client attribute data for each of the plurality of points of presence. The device selects, using the performance model, a particular point of presence from among the plurality of points of presence to be used by a particular client to access the online application, based on its client attribute data. The device causes the particular client to access the online application via the particular point of presence selected by the device using the performance model.

Figure 7:
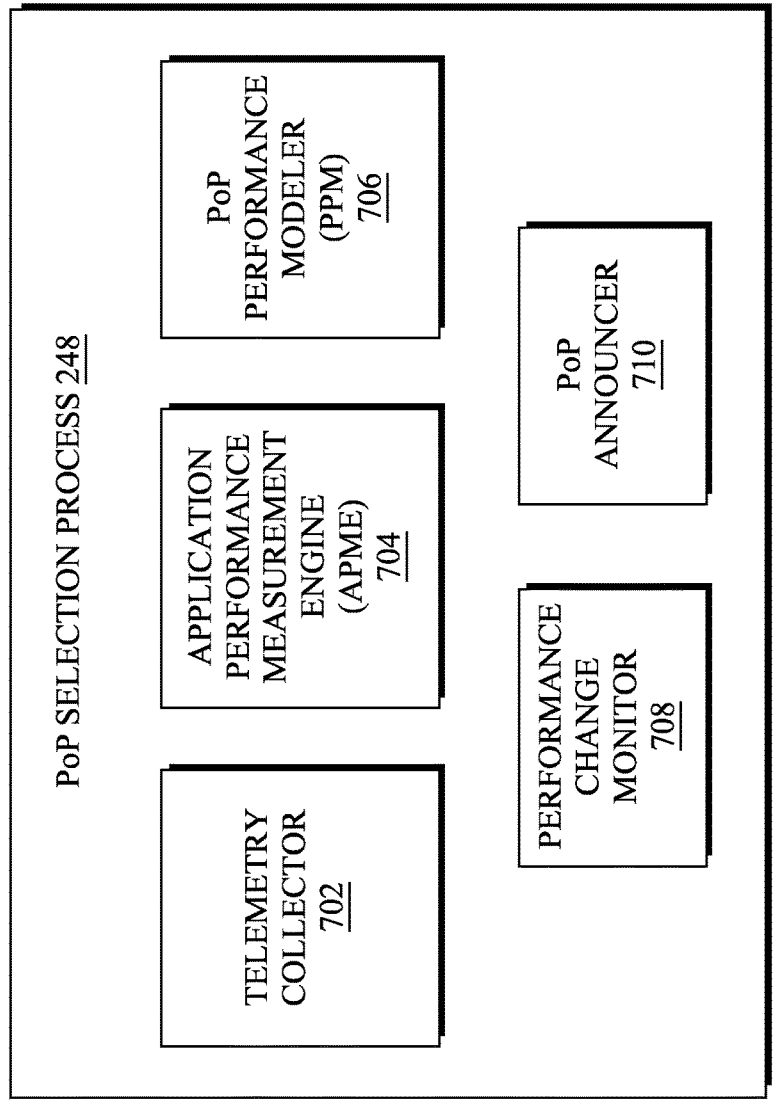
FIG. 7 illustrates an example architecture for PoP selection based on client features.

Operationally, FIG. 7 illustrates an example architecture 700 for PoP selection based on client features, according to various embodiments. At the core of architecture 700 is PoP selection process 248, which may be executed by a controller for a network or another device in communication therewith. For instance, PoP selection process 248 may be executed by a controller for a network (e.g., SDN controller 408 in FIGS. 4A-4B), a particular networking device in the network (e.g., a router, etc.), another device or service in communication therewith, or the like. In further embodiments, architecture 700 may be implemented as part of a SASE deployment.

As shown, architecture 700 may include any or all of the following components: a telemetry collector 702, an application performance measurement engine (APME) 704, a PoP performance modeler (PPM) 706, a performance change monitor 708, and/or a PoP announcer 710. As would be appreciated, the functionalities of these components may be combined or omitted, as desired. In addition, these components may be implemented on a singular device or in a distributed manner, in which case the combination of executing devices can be viewed as their own singular device for purposes of executing PoP selection process 248.

During execution, telemetry collector 702 is responsible for obtaining the telemetry data used by PoP selection process 248 for PoP selection, in various embodiments. Generally, such telemetry data may be indicative of the tunnel/path health, PoP associations with their various clients, and the attributes of those clients. In some embodiments, telemetry collector 702 may collect any or all of the following information:

PoP association: There might be multiple interfaces or tunnels on the router that is connected to multiple PoPs. For example, an edge router may have two different interfaces, and two tunnels (e.g., Tunnel1 and Tunnel2), with each connected to a different PoP (e.g., Tunnel1 connects to a PoP in Singapore, and Tunnel2 connects to a PoP in Hong Kong).

Probe data: The routers may employ the use of custom probes send to their PoPs that measure network metrics such as loss, latency, delay, etc., to different online applications via multiple tunnels/paths.

Application or NetFlow Data: This information may include data-plane traffic statistics observed on these tunnels. For example, NetFlow data can be collected as to how many clients or users there are, the applications to which they connect, etc.

Application Experience Metric(s): Some applications (e.g., Office365) may provide information indicative of an application experience metric, which could be on a per-session basis and associated with a particular router. For example, with Microsoft Informed Network Routing, Office365 can send application experience statistics such as {Good, Bad, Degraded, No-opinion} periods for the various Office365 applications (e.g., SharePoint, Teams, etc.) from a particular router interface. In one embodiment, these could be collected and stored in a datalake for retrieval by telemetry collector 702. In further cases, the application experience metric(s) could also be obtained from passive systems tracking network and application communication (e.g., LiveAction, DataDog, Cisco Routers with Application Response Time Netflows) and/or vendors which can share application performance data via API (e.g., Cisco Webex, AppDynamics, Microsoft Teams, Zoom, Google Talk, etc.). In one embodiment, all of those different metrics are normalized and used as a proxy to application experience score.

Local Interface Information: Local metrics (specific to an interface) may be obtained for each tunnel/path so as to track potential local issues (congestion) at the interface level that could explain the cause of potential delays that are not related to the PoP being used. Other local information may include memory utilization metrics, CPU utilization metrics, queue metrics, interface down events, rekey exchange failures, crash log information, or the like.

Other Metadata: In addition to the above data, other forms of data such as the geolocation of the router, geolocation of the PoPs, service provider associations (e.g., for a given public IP) can also be obtained by telemetry collector 702. In another example, the metadata may also be indicative of device attributes of the clients, such as their makes, models, software versions, browser information, or the like.

In various embodiments, APME 704 may be responsible for responsible for measuring the application performance across all PoPs. In one embodiment, APME 704 may send data to a user interface that allows an administrator to map different application names to SaaS applications. For instance, such a mapping may map Network Based Application Recognition (NBAR) application IDs to online applications. Custom or off-the-shelf probes may be designed and used to measure proxy metrics that can approximate the application experience, in some embodiments. For example, the administrator may trigger measurement of transaction time of PowerPoint and SharePoint applications, periodically (e.g., 5 minutes), from every router to the SaaS application. This can be done through custom probing or by using an existing probing solution, such as ThousandEyes. The administrator may specify, via the user interface, how often to probe and/or to which applications. In other embodiments, the administrator can also specify how often to switch the probes on different tunnels/paths. For example, the administrator may specify that the transaction time measurements to a given SaaS application should be switched from one tunnel to another every fifteen minutes. In turn, APME 704 may cause probing agents in the network to send the configured probes, the results of which may be stored in the datalake accessed by telemetry collector 702 or elsewhere.

PoP performance modeler (PPM) 706 may be responsible for selecting the best PoP for any arbitrary client, or set of client attributes, in various embodiments. To do so, PPM 706 may be responsible for learning which is the best PoP for a given application is and client. In one embodiment, PPM 706 may construct a (tabular) data mapping of the transaction times or other application experience metrics from APME 704 to different client attributes such as site, latitude, longitude, city, region, country, service provider, device attributes (e.g., device type, browser, etc.), combinations thereof or the like.

In various embodiments, PPM 706 may perform correlation analysis with the local interface selected for a given PoP, to rule out the router or local interface as being the root cause of any poor performance of connections to that PoP. For example, if a PoP A is selected systematically using a local interface I1 that is detected as being congested, then PPM 706 may send a notification to the administrator notifying them that the root cause is not the PoP itself but the local interface. Regardless, even in the presence of local issues, the PoP mechanism detailed below may still be applied.

In one embodiment, PPM 706 may build an ordered set of features to determine the application experience metric as a function of these attributes. For example, the following feature set (FS) templates can be used:
1. FS1: {Site}
2. FS2: {City, SP, Region, Country}
3. FS3: {City, Region, Country}
4. FS4: {Region, SP, Country}

5. FS5: {Region, Country}
6. FS6: {Country, SP}
7. FS7: {Country}

For each instance of the features set, PPM 706 may construct a statistical model 1o for the application experience metric (e.g., transaction time, etc.) with respect to the different PoPs. For example, FS2 may have seen 100 instances (i.e., 100 combinations of <site, city, SP, region, country> for FS2). For each of the instances, PPM 706 may compute the distribution of the experience metric with respect to different PoPs. If there is not enough data, such <instance, PoP> pair can be skipped. PPM 706 can then build a statistical model to answer the question as to which PoP has the best distribution of application experience.

In one approach, PPM 706 may compare the simple median values or other percentile values of application experience across different PoPs, to determine the best PoP. In another approach, PPM 706 may leverage a hypothesis testing framework, to compare the distributions between two PoP pairs. This will give the probability value (p-value) which, in this case, loosely indicates how confident the system is that one distribution is the same as another distribution. If the p-value is, say, less than 0.05 (5%), then the PoP with the best application experience distribution is chosen. Otherwise, PPM 706 may consider both PoPs to provide similar application experiences. PPM 706 may also give each PoP a score or representative application experience (e.g., median) for a given instance of feature-set. In another embodiment, PPM 706 may also maintain information as to how good the current PoP is with respect to the next best PoP (e.g., p-score difference between the given PoP and any other PoP). The output of feature-set, instance, PoP and score are then maintained by PPM 706. For example, PPM 706 may maintain the following table mapping client attribute (Instance) and best PoP:

TABLE 1

| Application | Feature Set | Instance | PoP | Experience Metric | p-score Difference |
|---|---|---|---|---|---|
| PowerPoint | FS7 | <country = IN> | Equinox Singapore | 17 | 1e−4 |
| PowerPoint | FS7 | <country = IN> | Equinox Hong Kong | 32 | 1e−3 |
| PowerPoint | FS7 | <country = AE> | Equinox Singapore | 15 | 1e−4 |
| PowerPoint | FS7 | <country = AE> | Equinox Tokyo | 27 | 1e−3 |
| ... | ... | ... | ... | ... | ... |
| PowerPoint | FS2 | <city = San Jose, SP = ATT, region = California, country = US> | PoPX | y | z |

Finally, given a set of client attributes, PPM 706 may reference its constructed table (e.g., in order going first from FS 1 instances and then finally to FS7 in Table 1), to find the PoP with the best application experience for selection.

In another embodiment, PPM 706 may also consider the application experience with respect to time. For example, in the above embodiment, PPM 706 may further bucketize the transaction time distribution by hour-of-the-day and day-of-the-week. In turn, the model may then predict the best PoP for a client for a given arbitrary time of the day.

In another embodiment, PPM 706 may also provide data to a user interface, to allow an administrator to configure which feature set and instances should be used for estimation of PoP performance, and which ones should not be. The administrator may select only a few subsets of the feature sets and instances on which to base the selection. In addition, the administrator may also be able to specify which feature set(s) or a particular instance should not be considered during the selection. For instance, the administrator may specify to PPM 706 that PoP selection should not be performed for any instance with combination <country=US, region=California>).

In yet another embodiment, PPM 706 may select the best PoP by building a classification model. In such a case, the features for the model may be all of the client features/attributes (and their temporal features, if considered), to output the best PoP. In this approach, categorical features (e.g., country=US) could be one-hot encoded.

In yet another embodiment, PPM 706 may also select a PoP, irrespective of the application. For example, if choosing Equinix Singapore PoP is always good for routers in Malaysia, then PPM 706 may maintain such information and make its recommendations, accordingly. Note that this can be done by simply checking which PoP is the best across all applications. If there is one PoP that is clearly best across all online applications, then PPM 706 could designate that PoP as the application-agnostic, best PoP to use for clients with that set of client attributes.

Another potential component of architecture 700 is performance change monitor 708, which is responsible for detecting when the best PoP changes, in various embodiments. If such a change is identified, performance change monitor 708 may send a notification (e.g., to the client or clients affected) as to which PoP is now considered to be the best. In one embodiment, for all the existing clients, performance change monitor 708 may monitor the best PoP (e.g., by running the model of PPM 706 periodically, such as every hour). If there is a change in the best PoP selected, performance change monitor 708 may send a message to the client or its router to update its PoP. In some cases, performance change monitor 708 may offer some buffer time before making such an announcement (e.g., if there is a change in the best PoP for at least n-number of hours). Such local actions could also be driven by the use of a policy engine. For instance, the local administrator may make use of a policy that specifies the set of allowable actions. Thus, performance change monitor 708 may inform the remote router to move from PoP A to PoP B, if and only if the application experience A can be improved by x % in a given region, according to one example policy.

Finally, architecture 700 may include PoP announcer 710, which is responsible causing a given client to use the selected PoP to connect to a specific online application or set of applications. To do so, in various embodiments, PoP announcer 710 may send an notification of the best PoP to the client or its router. For clients for which PoP selection was already performed, PoP announcer 710 may periodically notify them as to their current best PoP(s) or on detection by performance change monitor 708 of a change in their best PoPs. In other embodiments, PoP announcer 710 may cause the selected PoP to be used by updating a Domain Name System (DNS) resolver for a set of features. In doing so, upon a new client request (e.g., new router), the DNS can assign the best PoP, based on this information.

Figure 8:
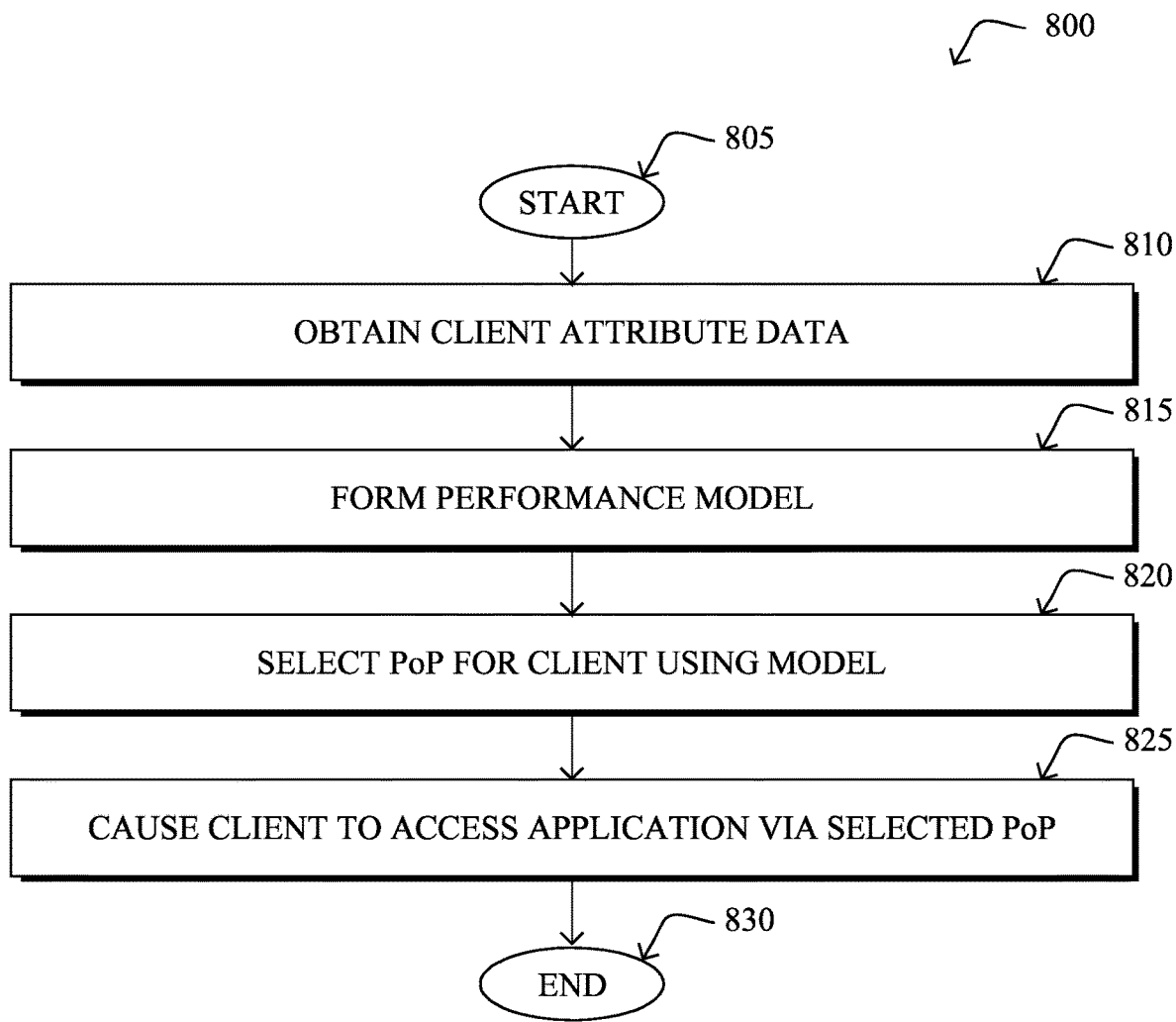
FIG. 8 illustrates an example simplified procedure for selecting a PoP based on client features.

FIG. 8 illustrates an example simplified procedure 800 for selecting a PoP based on client features, in accordance with one or more embodiments described herein. For example, a non-generic, specifically configured device (e.g., device 200), such as controller for a network (e.g., an SDN controller or other device in communication therewith, a networking device, etc.), may perform procedure 800 by executing stored instructions (e.g., PoP selection process 248). The procedure 800 may start at step 805, and continues to step 810, where, as described in greater detail above, the device may obtain client attribute data for clients of an online application that access the online application via a plurality of points of presence (PoPs) in a network. For instance, in one embodiment, the plurality of PoPs may comprise SASE PoPs. In various embodiments, the client attribute data comprises one or more of: geolocations of the clients, service providers used by the clients to access the online application, device types of the clients, or software executed by the clients.

At step 815, as detailed above, the device may form a performance model that models an application experience metric for the online application as a function of the client attribute data for each of the plurality of points of presence. In one embodiment, the application experience metric is provided by the online application for use by the device. In another embodiment, the application experience metric is based in part on probing results for network paths between the clients of the online application and the plurality of points of presence in the network. In a further embodiment, the application 1o experience metric is indicative of a transaction time for the online application. In some embodiments, the device may also receive, from a user interface, a selection of which attributes from the client attribute data should be used as features by the performance model.

At step 820, the device may select, using the performance model, a particular point of presence from among the plurality of points of presence to be used by a particular client to access the online application, based on its client attribute data, as described in greater detail above.

At step 825, as detailed above, the device may cause the particular client to access the online application via the particular point of presence selected using the performance model. In one embodiment, the device may do so by updating a DNS resolver to direct the particular client to the particular PoP. In another embodiment, the device may do so by sending an instruction to the particular client to access the online application via the particular PoP. In some embodiments, the device may also determine that the application experience metric for the particular point of presence has changed and, in response, cause traffic associated with the particular client to be directed via a different point of presence from among the plurality of points of presence. Procedure 800 then ends at step 830.

It should be noted that while certain steps within procedure 800 may be optional as described above, the steps shown in FIG. 8 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

While there have been shown and described illustrative embodiments that provide for SASE PoP selection based on client features, it is to be understood that various other adaptations and modifications may be made within the spirit and scope of the embodiments herein. For example, while certain embodiments are described herein with respect to using certain models for purposes of predicting application experience metrics, SLA violations, or other disruptions in a network, the models are not limited as such and may be used for other types of predictions, in other embodiments. In addition, while certain protocols are shown, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

The invention claimed is:

1. A method comprising:
    obtaining, by a device, client attribute data for clients of an online application that access the online application via a plurality of points of presence in a network;
    forming, by the device, a performance model that models an application experience metric for the online application as a function of the client attribute data for each of the plurality of points of presence;
    selecting, by the device and using the performance model, a particular point of presence from among the plurality of points of presence to be used by a particular client to access the online application, based on its client attribute data; and
    causing, by the device, the particular client to access the online application via the particular point of presence selected using the performance model.

2. The method as in claim 1, wherein the application experience metric is provided by the online application for use by the device.

3. The method as in claim 1, wherein the application experience metric is based in part on probing results for network paths between the clients of the online application and the plurality of points of presence in the network.

4. The method as in claim 1, wherein the application experience metric is indicative of a transaction time for the online application.

5. The method as in claim 1, further comprising:
    determining, by the device, that the application experience metric for the particular point of presence has changed; and, in response,
    causing, by the device, traffic associated with the particular client to be directed via a different point of presence from among the plurality of points of presence.

6. The method as in claim 1, wherein the client attribute data comprises one or more of: geolocations of the clients, service providers used by the clients to access the online application, device types of the clients, or software executed by the clients.

7. The method as in claim 1, further comprising:
receiving, at the device and from a user interface, a selection of which attributes from the client attribute data should be used as features by the performance model.

8. The method as in claim 1, wherein causing the particular client to access the online application via the particular point of presence selected using the performance model comprises:
updating a domain name system (DNS) resolver to direct the particular client to the particular point of presence.

9. The method as in claim 1, wherein causing the particular client to access the online application via the particular point of presence selected using the performance model comprises:
sending an instruction to the particular client to access the online application via the particular point of presence.

10. The method as in claim 1, wherein the plurality of points of presence comprise secure access service edge (SASE) points of presence.

11. An apparatus, comprising:
one or more network interfaces;
a processor coupled to the one or more network interfaces and configured to execute one or more processes; and
a memory configured to store a process that is executable by the processor, the process when executed configured to:
obtain client attribute data for clients of an online application that access the online application via a plurality of points of presence in a network;
form a performance model that models an application experience metric for the online application as a function of the client attribute data for each of the plurality of points of presence;
select, using the performance model, a particular point of presence from among the plurality of points of presence to be used by a particular client to access the online application, based on its client attribute data; and
cause the particular client to access the online application via the particular point of presence selected using the performance model.

12. The apparatus as in claim 11, wherein the application experience metric is provided by the online application for use by the apparatus.

13. The apparatus as in claim 11, wherein the application experience metric is based in part on probing results for network paths between the clients of the online application and the plurality of points of presence in the network.

14. The apparatus as in claim 11, wherein the application experience metric is indicative of a transaction time for the online application.

15. The apparatus as in claim 11, wherein the process when executed is further configured to:
determine that the application experience metric for the particular point of presence has changed; and, in response,
cause traffic associated with the particular client to be directed via a different point of presence from among the plurality of points of presence.

16. The apparatus as in claim 11, wherein the client attribute data comprises one or more of: geolocations of the clients, service providers used by the clients to access the online application, device types of the clients, or software executed by the clients.

17. The apparatus as in claim 11, wherein the process when executed is further configured to:
receive, from a user interface, a selection of which attributes from the client attribute data should be used as features by the performance model.

18. The apparatus as in claim 11, wherein the apparatus causes the particular client to access the online application via the particular point of presence selected using the performance model by:
updating a domain name system (DNS) resolver to direct the particular client to the particular point of presence.

19. The apparatus as in claim 11, wherein the apparatus causes the particular client to access the online application via the particular point of presence selected using the performance model by:
sending an instruction to the particular client to access the online application via the particular point of presence.

20. A tangible, non-transitory, computer-readable medium storing program instructions that cause a device to execute a process comprising:
obtaining, by the device, client attribute data for clients of an online application that access the online application via a plurality of points of presence in a network;
forming, by the device, a performance model that models an application experience metric for the online application as a function of the client attribute data for each of the plurality of points of presence;
selecting, by the device and using the performance model, a particular point of presence from among the plurality of points of presence to be used by a particular client to access the online application, based on its client attribute data; and
causing, by the device, the particular client to access the online application via the particular point of presence selected using the performance model.

* * * * *

UNITED STATES PATENT AND TRADEMARK OFFICE
CERTIFICATE OF CORRECTION

| | | |
|---|---|---|
| PATENT NO. | : 12,143,289 B2 | Page 1 of 1 |
| APPLICATION NO. | : 17/712423 | |
| DATED | : November 12, 2024 | |
| INVENTOR(S) | : Vinay Kumar Kolar et al. | |

It is certified that error appears in the above-identified patent and that said Letters Patent is hereby corrected as shown below:

In the Specification

Column 12, Line 23 please amend as shown:
etc.), service provider, temporal features, combinations Column 14, Line 42 please amend as shown:
for a given application and client. In one embodiment, Column 15, Line 56 please amend as shown:
FS1 instances and then finally to FS7 in Table 1), to find the Column 17, Line 41 please amend as shown:
the application experience metric is indicative of a Signed and Sealed this
Fourth Day of February, 2025

Coke Morgan Stewart
*Acting Director of the United States Patent and Trademark Office*